No. 753,883. PATENTED MAR. 8, 1904.
J. HOFFMAN.
SWATHER ATTACHMENT FOR MOWING MACHINES.
APPLICATION FILED JUNE 18, 1903.
NO MODEL. 3 SHEETS—SHEET 1.
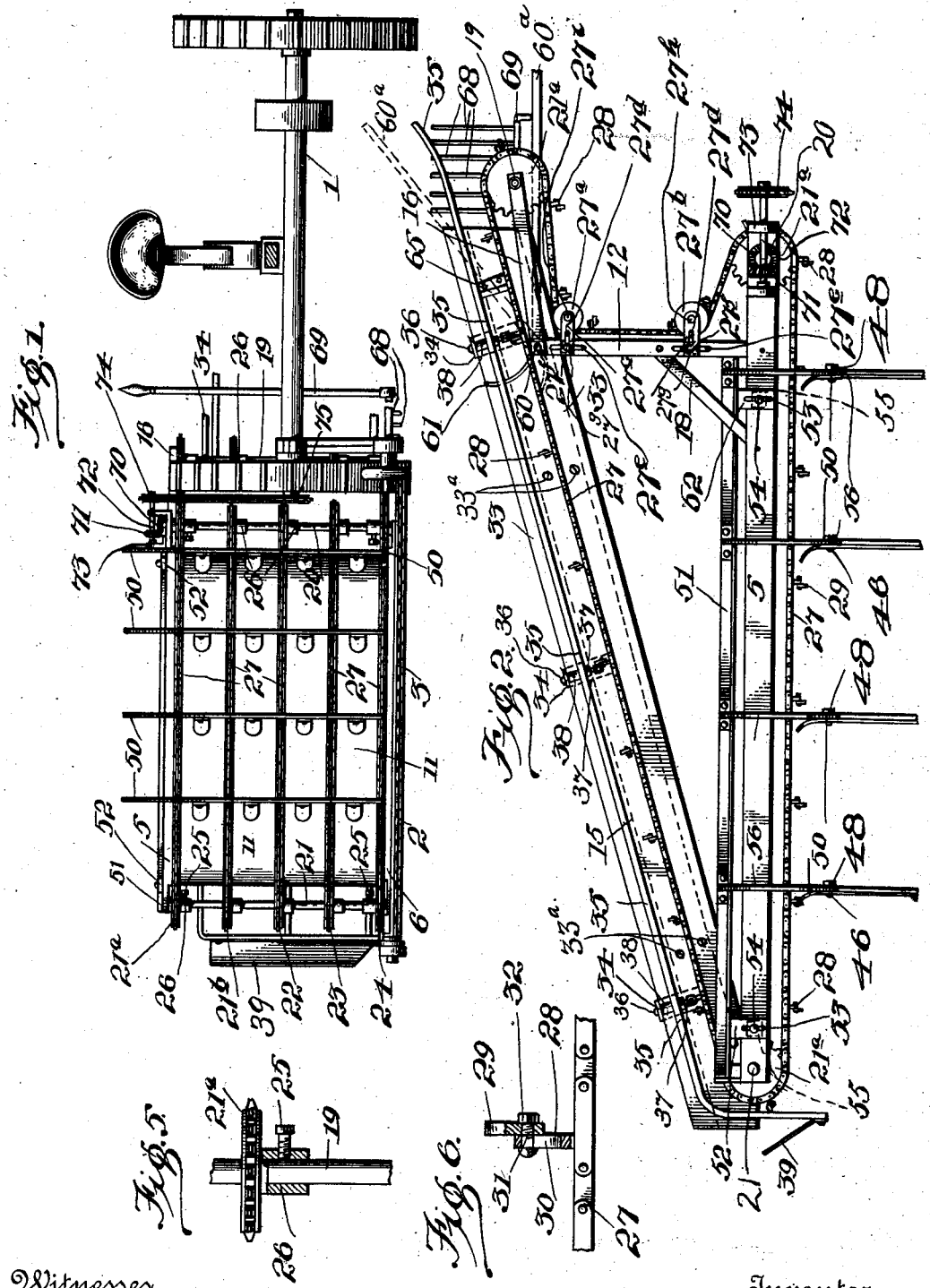

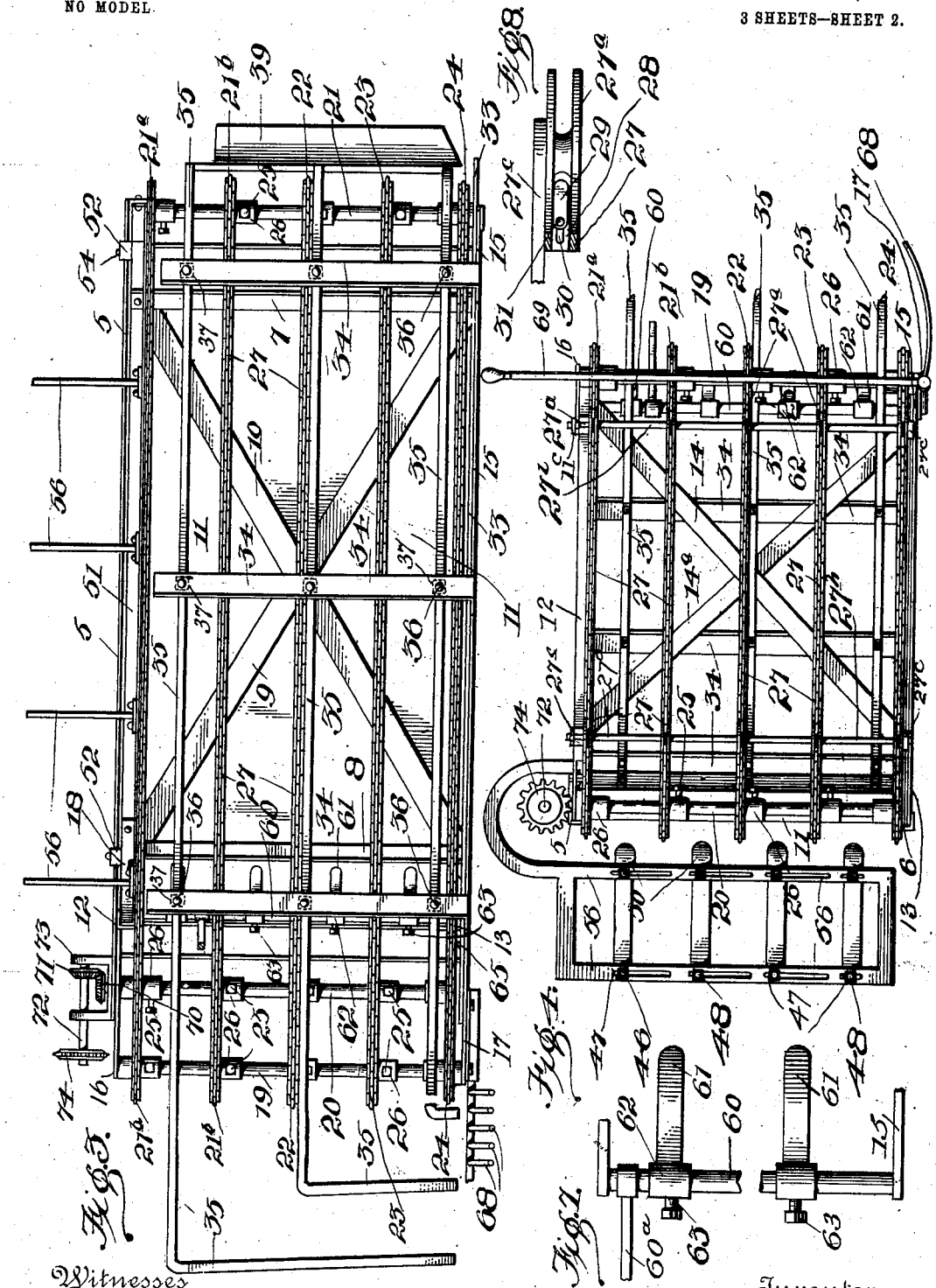

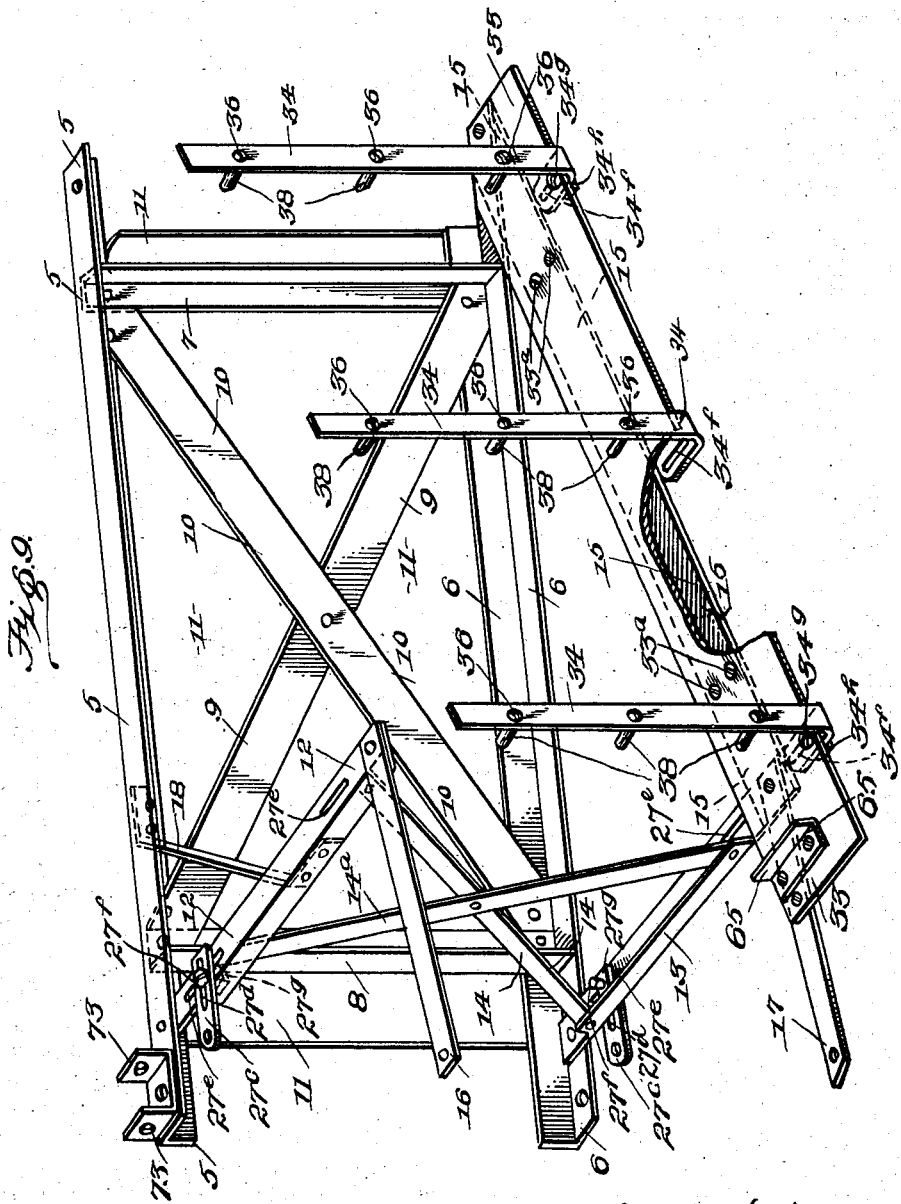

No. 753,883. Patented March 8, 1904.

UNITED STATES PATENT OFFICE.

JACOB HOFFMAN, OF SIDNEY, NEW JERSEY.

SWATHER ATTACHMENT FOR MOWING-MACHINES.

SPECIFICATION forming part of Letters Patent No. 753,883, dated March 8, 1904.

Application filed June 16, 1903. Serial No. 161,639. (No model.)

*To all whom it may concern:*

Be it known that I, JACOB HOFFMAN, a citizen of the United States, and a resident of Sidney, in the county of Hunterdon and State of New Jersey, have invented certain new and useful Improvements in Swather Attachments for Mowing-Machines, of which the following is a specification.

My invention relates to a swather attachment for mowing-machines.

The object of my invention is to provide a swather attachment for mowing-machines which will work in any kind of grain, and, further, to provide such an attachment capable of being mounted on the guard-plate of the mowing-machine, whereby grain can be cut and thrown off in one continuous operation.

In the drawings, Figure 1 is a front view of a portion of a mowing-machine, showing my swather attachment mounted on the guard-plate for the cutter-knives. Fig. 2 is a plan view thereof. Fig. 3 is a rear view thereof. Fig. 4 is an end view thereof. Fig. 5 is a detail view, on an enlarged scale, of one of the adjustable sprocket-wheels, showing the means for adjustably securing it on its shaft. Fig. 6 is a detail view, on an enlarged scale, of one of the adjustable fingers carried on the conveyer-chain. Fig. 7 is a detail view, on an enlarged scale, of one of the adjustable fingers of the clearing device, showing the means for adjustably securing it on its shaft. Fig. 8 is a detail view, on an enlarged scale, of one of the pulleys taking up the slack in the conveyer-chains. Fig. 9 is a perspective view, some of the parts being removed to show the construction of the frame.

Corresponding parts in all the figures are denoted by the same reference characters.

Referring to the drawings, 1 designates a portion of a mowing-machine, and 2 the cutter mechanism, on the guard-plate 3 of which my swather attachment is mounted.

The frame of my swather attachment comprises the front frame, consisting of upper and lower angle-bars 5 and 6, vertical angle-bars 7 and 8, connecting the bars 5 and 6, cross-braces 9 and 10, connecting the bars 7 and 8, and sheathing 11, connected to the braces 9 and 10 and closing in the space between the bars 5 and 6 to a point near their ends, an end frame, consisting of upper and lower angle-bars 12 and 13, having their forward ends connected to the bars 5 and 6, respectively, at one end, cross-bars 14 and $14^a$, connecting the upper and lower bars 12 and 13, arms 16 and 17, having their inner ends connected to the rear ends of the top bars 12 and 13, and an upper bar 18, connected at one end to the bar 5 and at the other end to the bar 12.

In the ends of the bars 5 and 6 of the front frame are journaled shafts 20 and 21, and in the outer ends of the arms 16 and 17 is journaled a shaft 19. On each of these shafts a plurality of sprockets $21^a$, $21^b$, 22, 23, and 24 are secured, the sprockets being adjustably secured by screws 25, passing through hubs 26 on said sprockets and engaging the shafts passing through them, such adjustment being provided so that the sprockets may be raised or lowered to thereby raise and lower the sprocket or conveyer chains 27, running around them, and a plurality of pulleys $27^b$ and $27^a$ on shafts $27^h$ and $27^i$, respectively, for taking up any slack in the chains and around which they also pass, are adjustably secured to the end frame by means of brackets $27^c$, having slots $27^d$, slots $27^e$ in bars in the end frame, and bolts $27^f$, passing through said slots and provided with nuts $27^g$. The sprocket chains or conveyers are provided with a plurality of fingers 28, secured thereto at about every fourth link, each having members 29, adjustably secured thereon by means of a slot 30 in one member and a threaded bolt 31 secured to the other member and passing through said slot and having a nut 32 run on its ends. A plate 33 is secured at $33^a$ to the bar 15, which is connected at one end to the inner end of the arm 17 and the end of the bar 13 at their point of juncture and at the other end to one end of the bar 6, and said plate adjustably supports a guard-frame comprising vertical bars 34, having their lower ends turned under said plate 33 and slotted at $34^f$ and secured to the outer edge thereof by screws $34^g$, passing through the plate 33 and slots $34^f$ and provided with nuts $34^h$, and a plurality of slats 35 are secured on said vertical bars 34 by means of threaded bolts 36, passing therethrough and provided with nuts 37 on their ends, and sleeves 38 on said bolts interposed between said bars and slots to hold them apart. The slats 35 start from a point adjacent the shaft 19 and run parallel with the plate 33 to the other end of the machine and bend around the shaft 19, where they have a vertical plate 39, secured thereon for the purpose of separating the standing grain from the cut grain at that point. The top slat 35 is bent down and inwardly, so that the end projects to a line on a level with the lower slat, and each intermediate slat is likewise bent down, but at a point short of that at which the top slat is bent, so as to present slats disposed at an equal distance apart from end to end.

A plurality of guides 50 are secured on an angle-bar 51, adjustably supported by brackets 52, secured to the top bar of the front frame by means of slots 53 in the brackets and threaded bolts 54, secured to the angle-bar 5 and provided with nuts 55 on their ends. Each guide comprises an open frame 56, provided with curved fingers adjustably secured thereon by means of bolts 46, passing through said frame and through elongated slots 47 in said fingers and having nuts 48 on their ends, said fingers extending within a short distance of the endless sprocket-chains or conveyers. A clearing device is provided for the purpose of forcing the cut grain on its course around the back of the machine on the plate 33 and between the guard-frame and the endless conveyers, said device being mounted in the end frame and comprises a vertical shaft 60, journaled in the upper and lower bars thereof and having a lever 60$^a$ and a plurality of fingers 61, said fingers being adjustably secured thereto by means of collars 62 encircling said shaft and provided with screws 63, projecting therethrough and engaging said shaft, the adjustment of said fingers being for the purpose of accommodating them to any adjustment of the chains between which they project.

When not in use, the clearing device is turned by the lever 60$^a$ to the position shown in dotted lines, Fig. 2, by forcing said lever forward, and if the cut grain which is being forced along by the endless conveyers gets clogged up at the delivery end of the machine the lever 60$^a$ is drawn backward, bringing the clearing device to the position shown in full lines, where it bears against the grain, and by drawing said lever backward still farther it forces the grain on its course.

A catch device to support the grain as it is thrown by a vertically-extending plate or trip 65 is mounted at the end of the plate 33 and has prongs 68 and a lever 69, extending upward within reach of the driver, said catch device during the operation of the machine being thrown down within a short distance of the stubble, but raised to clear the stubble when the machine is being turned. For the purpose of operating the chains or endless conveyers a gear 70, secured to the journal of the shaft 20, engages a gear 71, secured on a shaft 72, journaled in a housing 73, secured to the bar-top 5, and a sprocket-wheel 74, secured on the projecting end of said shaft 72, is connected to the gear 75 on the axle of the mowing-machine.

The trip 65 comprises an L-shaped plate secured to the plate 33 in the path of the grain moved thereon by the conveyers, and it will be understood that when the lower ends of the grain strike the upwardly-projecting member of the trip it will be thereby thrown down into a horizontal position.

The operation is as follows: As the machine is drawn through the grain the guides separate the standing grain and guide it to the cutting mechanism at the front of the machine, where it is cut and moved along by the fingers on the endless carriers to the back of the machine, and when it arrives at a point near the end of the plate 33 it is thrown down by the trip 65 onto the catch device and removed from the machine. If the grain should get clogged at the point near the trip, the clearing device can be operated by the lever 60$^a$ to force it on its way.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having thus described my invention, I claim and desire to secure by Letters Patent—

1. In a mowing-machine, the combination with the cutting mechanism, of a swather attachment mounted on the guard-plate thereof and comprising a frame, a plurality of endless conveyers one above the other running around said frame, and a plurality of guides for separating the standing grain, said guides supported at the front of the machine, and spaced from the cutting mechanism and endless conveyers and allowing the passage of the cut grain in an upright position between them and said cutting mechanism and the endless conveyers, substantially as described.

2. In a mowing-machine, the combination with the cutting mechanism, of a swather attachment mounted on the guard-plate thereof and comprising a vertical frame, a plurality of endless conveyers one above the other running around said frame, and a plurality of horizontally-adjustable guides for separating the standing grain, said guides supported at the front of the machine and spaced from the cutting mechanism and endless conveyers and allowing the passage of the cut grain in an upright position between them and said cutting mechanism and the endless conveyers, substantially as described.

3. In a mowing-machine, the combination with the cutting mechanism, of a swather attachment mounted on the guard-plate thereof and comprising a vertical frame, a plurality of endless conveyers one above the other running around said frame and a plurality of guides having vertically-adjustable fingers, said guides supported at the front of the machine and spaced from the cutting mechanism and endless conveyers and allowing the passage of the grain in an upright position between them and said cutting mechanism and endless conveyers, substantially as described.

4. In a mowing-machine, the combination with the cutting mechanism, of a swather attachment mounted on the guard-plate thereof and comprising a vertical frame, and a plurality of endless conveyers one above the other running around said frame, and having extensible fingers, substantially as described.

5. In a mowing-machine, the combination with the cutting mechanism, of a swather attachment mounted on the guard-plate thereof, and comprising a vertical frame, and a plurality of endless conveyers one above the other running around said frame, and a tension device for said conveyers, substantially as described.

6. In a mowing-machine, the combination with the cutting mechanism, of a swather attachment mounted on the guard-plate thereof, and comprising a vertical frame, a plurality of endless conveyers one above the other running around said frame, a plurality of guides for separating the standing grain, said guides supported at the front of the frame in front of the cutting mechanism and endless conveyers and allowing the passage of the cut grain in an upright position between them and the cutting mechanism and endless conveyers, and a guard-frame supported at the rear of the machine and spaced from the conveyers and allowing the passage of the cut grain in an upright position between it and said conveyers, and a device mounted at one end of said vertical frame for dividing the cut grain from the standing grain, substantially as described.

7. In a mowing-machine, the combination with the cutting mechanism, of a swather attachment mounted on the guard-plate thereof, and comprising a vertical frame, a plurality of endless conveyers one above the other running around said frame, a plurality of guides for separating the standing grain, said guides supported at the front of the frame in front of the cutting mechanism and endless conveyers and allowing the passage of the cut grain in an upright position between them and the cutting mechanism and endless conveyers, and a guard-frame supported at the rear of the machine and spaced from the conveyers and allowing the passage of the cut grain in an upright position between it and said conveyers, a device mounted at one end of said vertical frame for dividing the cut grain from the standing grain, and a device for preventing the clogging of the machine, substantially as described.

8. In a mowing-machine, the combination with the cutting mechanism, of a swather attachment mounted on the guard-plate thereof, and comprising a vertical frame, a plurality of endless conveyers one above the other running around said frame, a plurality of guides for separating the standing grain, said guides supported at the front of the frame in front of the cutting mechanism and endless conveyers and allowing the passage of the cut grain in an upright position between them and the cutting mechanism and endless conveyers, and a horizontally-adjustable guard-frame, substantially as described.

9. In a mowing-machine, the combination with the cutting mechanism, of a swather attachment mounted on the guard-plate thereof and comprising a vertical frame, a plurality of endless conveyers one above the other running around said frame, and a guard-frame supported at the rear of the machine, substantially as described.

10. In a mowing-machine the combination with the cutting mechanism, of a swather attachment mounted on the guard-plate thereof and comprising a vertical frame, a plurality of endless conveyers one above the other running around said frame, and a horizontally-adjustable guard-frame at the rear of the mechanism, substantially as described.

11. In a mowing-machine, the combination with the cutting mechanism, of a swather attachment mounted on the guard-plate thereof and comprising a vertical frame, a plurality of endless conveyers one above the other running around said frame, and a device for catching the grain as it leaves the machine, substantially as described.

12. In a mowing-machine, the combination with the cutting mechanism, of a swather attachment mounted on the guard-plate thereof, and comprising a vertical frame, a plurality of endless conveyers one above the other running around said frame, and a clearing device having vertically-adjustable fingers, substantially as described.

13. In a mowing-machine, the combination with the cutting mechanism, of a swather attachment mounted on the guard-plate thereof, and comprising a vertical frame, a plurality of endless conveyers located one above the other and running around said frame, and a clearing device, substantially as described.

14. In a mowing-machine, the combination with the cutting mechanism, of a swather attachment mounted on the guard-plate thereof, and comprising a vertical frame, and a plurality of endless conveyers one above the other running around said frame, and means for adjusting said conveyers vertically, substantially as described.

15. In a mowing-machine, the combination with the cutting mechanism, of a swather attachment mounted on the guard-plate thereof, and comprising a vertical frame, and endless conveying means running around said frame for moving the cut grain along in an upright position before the cutting mechanism and to the back of the machine, substantially as described.

16. In a mowing-machine, the combination with the cutting mechanism, of a swather attachment mounted on the guard-plate thereof, and comprising a vertical frame, and a plurality of endless conveyers one above the other running around said frame, means for adjusting said conveyers vertically, a plurality of guides for separating the standing grain, said guides supported at the front of the machine and spaced from the cutting mechanism and conveying means and allowing the passage of the cut grain in an upright position between them and said cutting mechanism and conveying means, substantially as described.

In testimony whereof I have signed my name in the presence of the subscribing witnesses.

JACOB HOFFMAN.

Witnesses:
J. C. PYBAS,
L. E. DUANE.